United States Patent

[11] 3,586,387

| [72] | Inventors | Hugh E. Riordan<br>Ann Arbor;<br>Frank L. Moncher, Farmington, both of,<br>Mich. |
|---|---|---|
| [21] | Appl. No. | 804,436 |
| [22] | Filed | Mar. 5, 1969 |
| [45] | Patented | June 22, 1971 |
| [73] | Assignee | Kelsey-Hayes Company<br>Romulus, Mich. |

[54] SKID CONTROL SYSTEM
8 Claims, 3 Drawing Figs.

| [52] | U.S. Cl. | 303/21 B,<br>188/181 A |
|---|---|---|
| [51] | Int. Cl. | B60t 8/10,<br>B60t 8/12 |
| [50] | Field of Search | 303/21, 6,<br>61—63, 68—69; 188/181 |

[56] References Cited
UNITED STATES PATENTS

| 3,235,036 | 2/1966 | Meyer et al. | 303/21 |
| 3,362,757 | 1/1968 | Marcheron | 303/21 |
| 3,382,012 | 5/1968 | Lucien | 303/21 |
| 3,401,984 | 9/1968 | Williams | 303/21 |

Primary Examiner—Milton Buchler
Assistant Examiner—John J. McLaughlin
Attorney—Harness, Dickey & Pierce ABSTRACT: A skid control system for wheeled vehicles which operates to control braking as a function of the magnitude of slip speed and/or percent slip with the controlling magnitude of slip being varied as a function of vehicle deceleration and as a function of vehicle speed.

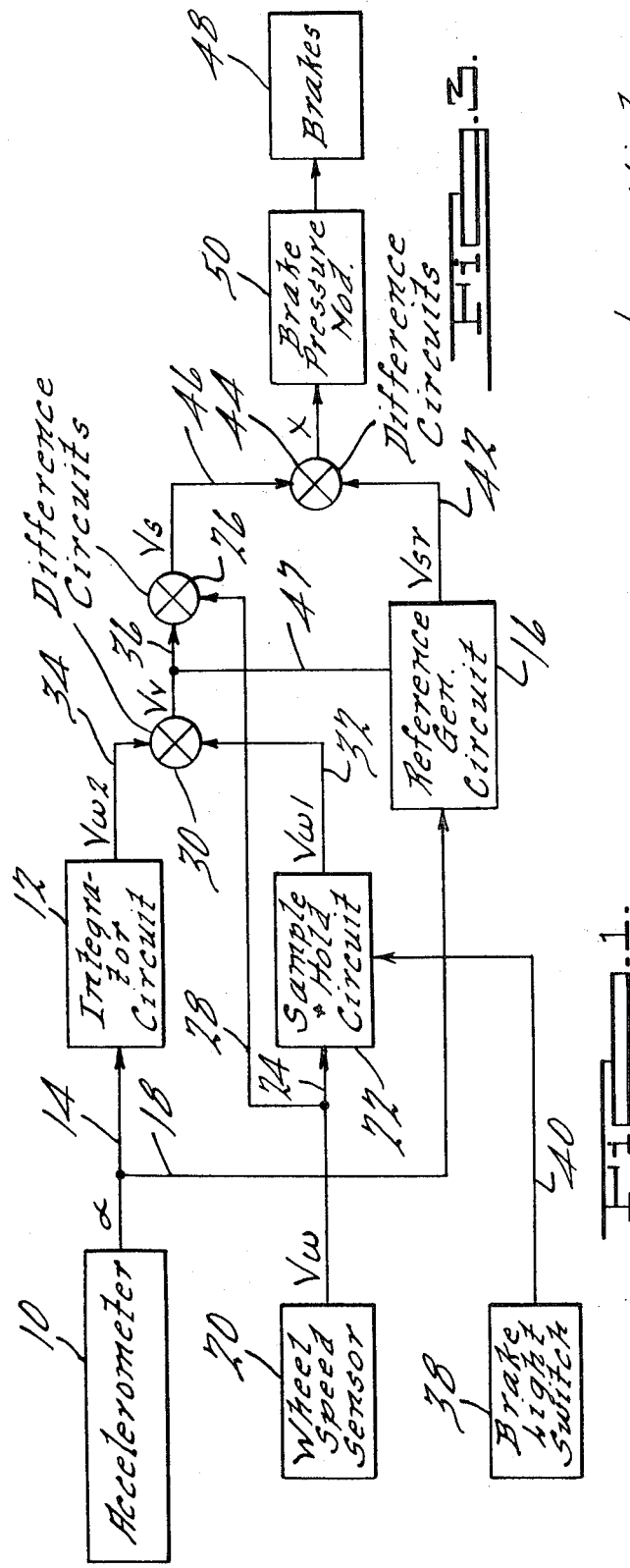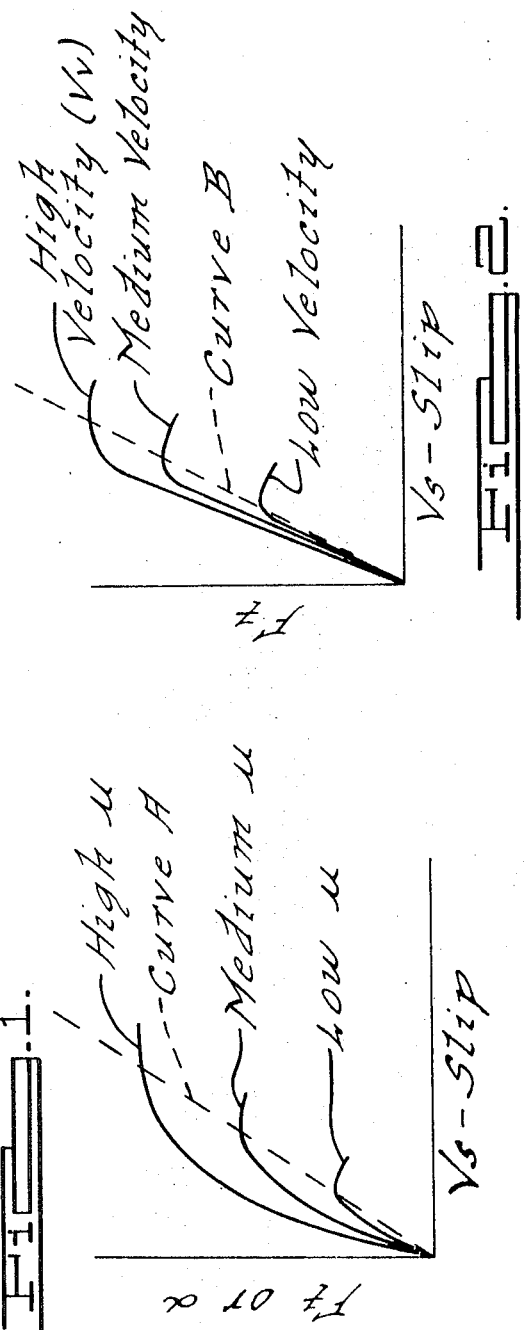

SKID CONTROL SYSTEM

SUMMARY BACKGROUND OF THE INVENTION

The present invention relates to a vehicle skid control system and more particularly a skid control system which operates as a function of slip.

Slip speed is defined as the difference between vehicle speed and wheel speed. In incipient skid conditions this difference becomes excessive and reaches a maximum at wheel lockup. Ideal braking occurs when the braking force provides a determinable slip speed which is less than the maximum, i.e. short of locked wheel. Thus braking of an automotive vehicle can be improved by maintaining the braking at a magnitude which will provide the ideal slip speed. This slip speed, however, will vary for different road conditions i.e. high, medium or low $u$. The maximum vehicle deceleration will also vary with road conditions.

In the present invention braking is controlled by relieving the brakes as a function of slip speed with the magnitude of the slip speed at which braking is relieved being varied as a function of the magnitude of the vehicle deceleration to provide a system sensitive to various road to tire adhesion conditions. In addition it is desirable for a given surface condition to maintain the percent slip substantially constant at a preselected value to provide maximum braking. Thus in the present invention the slip speed at which braking is released is varied also as a function of the vehicle velocity. Therefore it is an object of the present invention to provide a skid control system operative as a function of the magnitude of slip speed; it is another object to provide such a system in which the magnitude of the slip speed is varied to reflect various vehicle velocities and various road conditions. It is another object of the present invention to provide a novel skid control system operative as a function of the magnitude of the slip speed which magnitude is varied in accordance with the vehicle velocity under one type of road condition to maintain a substantially constant percent of slip and which magnitude is varied in accordance with vehicle deceleration to reflect changes in road conditions.

FIG. 1 is a graph depicting the relationship of tractive force (Ft) or vehicle deceleration ($\alpha$) versus slip speed (Vs) for various road conditions;

FIG. 2 is a graph depicting tractive force (Ft) versus slip speed (Vs) for various vehicle velocities; and FIG. 3 is a block diagram of the system of the present invention.

Looking now to FIG. 1 a family of curves is shown depicting the relationship between the tractive force (Ft) of the tire with the road in braking and the slip speed i.e. vehicle speed (Vv) minus wheel speed (Vw). It can be seen that under each of the different road conditions, i.e. high $u$, medium $u$, etc., a determinable magnitude of slip speed (Vs) will result in maximum retarding force (Ft) or vehicle deceleration ($\alpha$). It can also be noted that the desirable magnitude of slip speed (Vs) to provide maximum tractive force in braking for the various road conditions varies as a generally linear function (curve A) with respect to vehicle deceleration.

Looking to FIG. 2 the relationship between tractive force (Ft) in braking versus slip speed (Vs) is shown for one surface condition, e.g. high $u$, and for various vehicle velocities. It can be seen that to maximize tractive force the magnitude of slip speed should be varied as a function of vehicle velocity such that the percent of slip ($Vs/Vv$) is substantially a constant.

In the system of the present invention, as shown in FIG. 3, the braking force or pressure is relieved when the slip speed (Vs) exceeds a preselected magnitude and in order to compensate for different road conditions this magnitude is varied as a function of vehicle deceleration ($\alpha$) such that the preselected magnitude (Vs) will generally vary linearly in the manner of curve A; in addition in order to compensate for different vehicle velocities this magnitude is varied as a function of vehicle velocity (Vv) such that the preselected magnitude (Vs) will generally vary linearly in the manner of curve B.

Looking now to FIG. 3, the system includes a linear accelerometer 10 having an acceleration (or deceleration) output signal $\alpha$ the magnitude of which corresponds to the acceleration (or deceleration) of the vehicle. The acceleration signal $\alpha$ is conducted to an integrator circuit 12 via conductor 14 and to a reference generator circuit 16 via conductor 18. A wheel speed sensor 20 provides an output signal Vw the magnitude of which is an indication of linear wheel velocity for the one or more wheels of the vehicle the brake of which is to be controlled. The wheel velocity signal Vw is transmitted to a sample and hold circuit 22 via conductor 24 and to a difference circuit 26 via conductor 28. The output signal Vw1 from the hold circuit 22 is transmitted to a difference circuit 30 via conductor 32; the output signal Vw2 from the integrator circuit 12 is also transmitted to difference circuit 30 via conductor 34 whereby an output signal Vv representative of instantaneous vehicle velocity will result at output conductor 36. The signal Vv is obtained in the following manner. During non braking conditions the velocity of the vehicle (Vv) and the linear wheel velocity (Vw) are equal. During braking, however, as a result of slip the vehicle velocity Vv is greater than wheel velocity Vw. By detecting the deceleration of the vehicle during braking via accelerometer 10 and integrating the deceleration signal $\alpha$ via the integrator 12 a signal Vw2 will be obtained which substantially represents the actual loss of velocity of the vehicle due to braking. The magnitude of linear wheel velocity Vw just prior to braking represents the velocity of the vehicle prior to any braking deceleration. The magnitude of this velocity is stored by sample and hold circuit 22. The hold circuit 22 will continuously sample the Vw; upon application of the brakes of the vehicle, the brake light switch 38 will be actuated and will provide a signal to hold circuit 22 via conductor 40 in response to which hold circuit 22 will hold and retain the magnitude of the signal Vw received just prior to actuation of switch 38 and will provide output signal Vw1 which is an indication of the magnitude of vehicle velocity just prior to that brake application. By subtracting the loss of vehicle velocity (Vw2) from the initial vehicle velocity (Vw1) an indication of instantaneous vehicle velocity (Vv) during the brake deceleration of the vehicle will be obtained. This subtraction is provided by the difference circuit 30. Next the actual magnitude of slip velocity (Vs) is obtained by subtracting the instantaneous vehicle velocity (Vv) from the linear wheel velocity (Vw). This subtraction is provided by the difference circuit 26.

The reference generator 16 provides a reference slip speed signal Vsr at conductor 42. The slip speed signal Vs is transmitted to difference amplifier 44 from difference circuit 26 via conductor 46 and is subtracted from the reference slip signal Vsr which is received via conductor 42. The magnitude of the reference signal Vsr is selected to be substantially equal to that magnitude of slip speed which provides maximum retarding force (Ft), see FIGS. 1 and 2. When the actual slip speed Vs exceeds the reference speed Vsr an output signal is provided from circuit 44 whereby brake pressure can be relieved or modulated. The magnitude of reference slip speed Vsr is varied with the deceleration signal $\alpha$ whereby the reference signal Vsr will vary in magnitude generally in the manner of curve A (FIG. 1) to provide for operation responsive to different road conditions i.e. high $u$, etc. At the same time the reference slip speed Vsr is varied with vehicle velocity (Vv) which is transmitted to the reference generator 16 via conductor 47. The reference generator 16 will vary the magnitude of reference slip speed (Vsr) with the magnitude of vehicle velocity (Vv) generally linearly in the manner of curve B, FIG. 2

The vehicle brakes 48 for the selected vehicle wheels will be relieved or modulated by a brake pressure modulator 50 which will provide appropriate modulation in response to the occurrence of signal $\alpha$ which will be generated when Vs exceeds Vsr. The modulator 50 can be of various constructions and could be of the type shown in the pending U.S. Pat. application of Every et al., Ser. No. 642,861, filed June 1, 1967, and the subject matter of that application is incorporated herein by reference. Thus with the system as shown and described braking will be controlled such as to maintain the determinable, advantageous magnitude of slip speed.

Note the specific constructional details of the accelerometer 10, wheel speed sensor 20 and brake light switch 38 and the specific circuit details of the integrator circuit 12, the sample and hold circuit 22, reference generator 18, and difference circuits 26, 30 and 44 in no way constitute a part of the present invention and are within the purview of one skilled in the art and have been omitted for the purpose of simplicity.

While it will be apparent that the preferred embodiment of the invention disclosed is well calculated to fulfill the objects above stated, it will be appreciated that the invention is susceptible to modification, variation and change without departing from the proper scope or fair meaning of the invention.

What we claim is:

1. A skid control system of a wheeled vehicle having a plurality of wheels and braking system for effecting braking of the wheels, said skid control system comprising: first means for providing a first signal having a magnitude indicative of the slip between the vehicle and at least one wheel of the vehicle, second means for modulating the braking at least at that one wheel in response to said first signal attaining a selected magnitude indicative of a preselected magnitude of slip, and an accelerometer for sensing frictional variations between the one wheel and the driving surface said second means varying the selected magnitude of said first signal at which brake modulation occurs in response to frictional variations between the one wheel and the driving surface as sensed by said accelerometer and with variation in vehicle speed.

2. The system of claim 1 with said first means including accelerometer means for providing a second signal indicative of the deceleration of the vehicle, said first means including velocity means for providing a velocity signal having a magnitude varying in accordance with the magnitude of the vehicle velocity, said second means responsive to said second signal and said velocity signal for varying the selected magnitude of said first signal at which brake modulation occurs in accordance with variations in the magnitude of said second signal and said velocity signal.

3. The system of claim 2 with said first and second means as responsive to said first, second and velocity signals providing brake modulation at lower magnitudes of slip for lower magnitudes of vehicle deceleration and at lower magnitudes of slip for lower magnitudes of vehicle velocity.

4. The system of claim 3 with said first means further comprising velocity means for providing a third signal having a magnitude varying in accordance with variations in magnitude of the speed of the one wheel, integrator means responsive to said second signal for providing a fourth signal representative of the integral of said second signal and hence the integral of the vehicle deceleration, sample means responsive to actuation of the brake system and to said third signal for providing a fifth signal having a magnitude indicative of the velocity of the wheel prior to actuation of the brake system, and computer means responsive to said fourth and fifth signals for providing said velocity signal and responsive to said third and velocity signals for providing a seventh signal having a magnitude indicative of the slip between the vehicle and that wheel.

5. The system of claim 4 with said second means comprising reference means for providing an eighth signal having a magnitude indicative of said preselected magnitude of slip at which brake modulation occurs and being varied in magnitude in accordance with variations in magnitude of said second and velocity signals, said computer means responsive to said seventh and eighth signals for providing an output signal in response to the relative magnitudes of said seventh and eight signals having a predetermined relationship, and modulating means responsive to said output signal for modulating the braking at that one wheel.

6. The system of claim 5 with said output signal being provided when the magnitude of said eighth signal exceeds the magnitude of said seventh signal.

7. The system of claim 3 with said first means further comprising velocity means for providing a third signal having a magnitude varying in accordance with variations in magnitude of the speed of the one wheel, integrator means responsive to said second signal for providing a fourth signal representative of the integral of said second signal and hence the integral of vehicle deceleration, sample means responsive to actuation of the brake system and to said third signal for providing a fifth signal having a magnitude indicative of the velocity of the wheel prior to actuation of the brake system, said second means comprising reference means for providing a reference signal having a magnitude indicative of said preselected magnitude of slip at which brake modulation occurs and being varied in magnitude in accordance with said second and velocity signals, computer means responsive to said fourth and fifth signals for providing said velocity signal and responsive to said third, fourth, fifth and reference signals for providing an output signal in response to the relative magnitudes of said third, fourth, fifth and reference signals having a predetermined relationship, and modulating means responsive to said output signal for modulating the braking at that one wheel.

8. The system of claim 7 with said predetermined relationship occurring when the slip as determined by said third, fourth, and fifth signals exceeds said preselected magnitude of slip as determined by said reference signal.